United States Patent [19]
Glover

[11] Patent Number: 5,581,773
[45] Date of Patent: Dec. 3, 1996

[54] MASSIVELY PARALLEL SIMD PROCESSOR WHICH SELECTIVELY TRANSFERS INDIVIDUAL CONTIGUOUSLY DISPOSED SERIAL MEMORY ELEMENTS

[76] Inventor: Michael A. Glover, 10 Hemlock Way, Durham, N.H. 03824

[21] Appl. No.: 881,616

[22] Filed: May 12, 1992

[51] Int. Cl.⁶ .................................................. G06F 13/00
[52] U.S. Cl. ........................ 395/800; 364/249; 364/252; 364/259.8; 364/DIG. 1
[58] Field of Search ............................ 395/800, 137; 345/126; 365/230.02, 189.02

[56] References Cited

U.S. PATENT DOCUMENTS

| | | | |
|---|---|---|---|
| 4,627,020 | 12/1986 | Anderson | 345/126 |
| 4,636,783 | 1/1987 | Omachi | 345/126 |
| 4,773,038 | 9/1988 | Hillis et al. | 395/500 |
| 4,805,091 | 2/1989 | Theil et al. | 395/800 |
| 4,806,920 | 2/1989 | Sawada | 345/126 |
| 4,827,403 | 5/1989 | Steel, Jr. et al. | 395/800 |
| 4,860,248 | 8/1989 | Lumelsky | 395/163 |
| 4,907,148 | 3/1990 | Morton | 395/800 |
| 4,985,832 | 1/1991 | Gramdalski | 395/800 |
| 5,008,815 | 4/1991 | Hillis | 395/800 |
| 5,014,235 | 5/1991 | Morton | 395/275 |
| 5,111,192 | 5/1992 | Kadakia | 345/126 |
| 5,197,140 | 3/1993 | Balmer | 395/400 |
| 5,299,159 | 3/1994 | Balistreri | 365/189.04 |
| 5,369,618 | 11/1994 | Takasugi | 365/230.01 |
| 5,381,163 | 1/1995 | Yokoyama | 345/126 |
| 5,475,649 | 12/1995 | Balistreri | 365/230.02 |

OTHER PUBLICATIONS

Preliminary Specification–MT43C4257/8 Rev Jan. 1991 Micron Technology, Boise Idaho.

Triple–Port DRAM (specification w/ applications) Micron Technology, Boise Idaho.

64-to-64 Crossbar Switch (XBAR) Preliminary, Apr. 89 LSI Logic Corporation, Milpitas, CA.

"The AIS-5000 Parallel Processor" L. A. Scmidt and S. S. Wilson, pp. 320–330 IEEE Trans. on Pat. Anal. and Mach. Int., vol. 10 No.3 May 88.

"DAP Architecture", Chapt. 2, DAP Series Technical Overview, Active Memory Technology, Inc., Berkshire, U. K.

"The MasPar MP–1 Hardware and Software Overview", Appendix (?), pp. A1–A11.

*Smart Memories*, by Peter Wayner, Byte, Mar. 1991 pp. 147–152.

*Primary Examiner*—Eric Coleman
*Attorney, Agent, or Firm*—Stephen G. Matzuk

[57] ABSTRACT

A parallel processor adapted to be used as a vector co-processor to a host computer, comprising a plurality of 1-bit processing elements (PEs) and an associated rapidly accessed memory and lateral data path switch providing rapid computational processing of data contained within contiguous bit locations of each 1-bit, and rapid lateral transfer between 1-bit PEs. The PEs implement the data logical and computational processing with a reduced instruction set. Rapid data transfer between the PE and the associated memory is provided by implementing such elements on a common semi-conductor substrate having shared data address and control signals, thus reducing the complexity of circuitry external to the chip. Flexible and rapid data transfer between and among PEs is provided with a switch element comprising a cross-bar which allows the parallel processor to provide rapid processing of video and other data. A preferred embodiment discussed herein implements the parallel processor using multi-port video DRAM devices as column-aligned parallel processors.

27 Claims, 6 Drawing Sheets

TYPE 1: BARRELL SHIFTER

TYPE 2: EXCHANGE

NORMAL COMPUTER MEMORY ALLOCATION FOR IMAGE

MASSIVELY PARALLEL SIMD PROCESSOR WHICH SELECTIVELY TRANSFERS INDIVIDUAL CONTIGUOUSLY DISPOSED SERIAL MEMORY ELEMENTS

FIELD OF THE INVENTION

The present invention relates to computer processors, particular to single instruction multiple data parallel processors.

BACKGROUND OF THE INVENTION

A SIMD, or Single Instruction Multiple Data parallel computer typically comprises a control unit connected to a large number of identical processing elements, or PEs. Each PE typically includes an Arithmetic Logic Unit (ALU), a few data registers and a data memory. In operation, data is read from the data memory of each PE, operated upon by each ALU, and stored back in the data memory. These operations are controlled by the control unit. The data registers in each PE facilitate the manipulation of data. As distinguishable from other parallel computers, the PEs in SIMD parallel processors perform the same operation at the same time, but operate on different data.

The throughput of a SIMD parallel processor is determined by the number of PEs multiplied by the throughput of each individual PE. Typically to maximize throughput, a SIMD design is a compromise between the number of PEs and the complexity of each PE, as the faster PE will generally be more complex as well. A simple 'figure of merit' for a particular SIMD design is determined according to the number of PEs that can be built on a particular integrated circuit (or 'chip') with the relative performance of each PE factored in. Generally, the more PEs per chip, the less costly the implementation for a given level of performance.

The typical commercially available SIMD parallel computers contain from 128 to 65,536 PEs, each of which typically have a 1-bit data paths and registers, operate at a relatively slow 5 or 10 Mhz cycle, and implement 3–72 PEs per chip.

SIMD parallel computers are frequently used to process image data from television cameras. However, the image data after being received from the video camera and digitized, is provided in a format generally orthogonal and incompatible with the format required by the PE data memories into which it must be written in order to be processed by each PE. Thus, to be practically useful, commercially available SIMD parallel computers solve this problem by including a separate hardware device for data re-formatting, called a "corner turner", which operates on the data externally from the PEs. However, this extra hardware is ultimately undesirable as it adds to the cost and complexity of a SIMD parallel computer.

One example of a commercially available SIMD parallel processor is the AIS-5000, manufactured by Applied Intelligent Systems of Ann Arbor, Mich. The AIS-5000 contains a total of 1,024 PEs and costs about $50,000. It implements 8 PEs with a group of two chips, yielding a simple figure of merit of 4 PEs per chip. One chip, which is a custom gate array, contains the ALUs and registers for 8 PEs and the other chip, which is an 8-bit wide commercially available memory chip, implements the memory associated with each PE. Therefore, the figure of merit for this machine is 4 PEs per chip. The basic machine cycle rate is 10 Mhz and it has 32,768 bits of memory per PE. The AIS-5000 contains 512 of these two-chip groups for a total of 1,024 chips. It has corner turning hardware built into the custom gate array chips.

Another example of a commercially available SIMD parallel computer is the CM-1, manufactured by Thinking Machines of Cambridge, Mass. The CM-1 contains a total of 65,536 PEs and costs about $3,000,000, and implements a group of 16 PEs with a group of 5 chips, yielding a simple figure of merit of 3.2 PEs per chip. One chip, which is a custom gate array, contains the ALUs and registers for 16 PEs, and the other four chips are commercially available memory chips and comprise the memory associated with the 16 PEs. The basic machine cycle rate is 5 Mhz; the machine has 4,096 bits of memory per PE. The CM-1 contains 4,096 of these 5- chip groups for a total of 20,480 chips.

A third representative example of a commercially available SIMD parallel computer is the NCR45SPDS SIMD Processor Development System, which is manufactured by NCR Corporation, Microelectronics Division, Fort Collins, Colo. It contains a maximum or 10,368 PEs. It is implemented with the NCR GAPP chip, which contains 72 PEs, implying a simple figure of merit of 72 PEs per chip. It has a cycle rate of 10 Mhz, but has only 128 bits of memory per PE, a small amount. It also has external corner turning hardware.

SUMMARY OF THE INVENTION

The SIMD processor according to the present invention comprises a plurality of individual memory processor elements (PEs) implemented with a single integrated circuit such as commercially available video dynamic random access memories (DRAM), and an associated programmable cross-bar switch configured to provide substantially all of the data reformatting, processing, and input/output transfer directly, and in close, on-chip association to provide significantly higher processing throughput for a given amount of compute hardware. According to one embodiment of the present invention, it has a higher figure of merit than other SIMD parallel computers, which is accomplished by increasing the number of PEs implemented per chip and solving the corner turning problem effectively with software instead of with additional specialized hardware.

The preferred embodiment of the invention has 32,768 PEs and contains an average of 2,048 PEs per chip. When factoring the effective cycle rates (for a given arithmetic function, e.g. addition) of the PEs, improvements in the figure of merit when compared to the typical prior art of 5:1 to 1,000:1 are achieved, yielding significantly greater implementation economies.

This advantage is provided by the implementation of 2,048 PEs (and the associated memories) with a single commercially available triple-port DRAM memory chip. Although designed to facilitate bit-plane manipulations in video display memories, the novel design according to the present invention causes a unique operation of the memories to perform the necessary arithmetic and logical operations in a manner not previously considered.

Another advantage is that the invention can solve the corner turning problem without special or corner turning hardware. The preferred embodiment first writes the image data into the PE data memories in the video camera format and then performs the corner turning operation quickly and efficiently by use of a software algorithm which can typically corner turn the data much faster than the data is generated by the video camera, which was not possible in other, prior art implementations.

According to the apparatus and methods of the present invention, data is received in a first format directly into registers of the processing element or into the associated memory storage elements, and converted into a second format more convenient to the parallel processing architecture by a combination of logical data manipulation within each of the individual 1-bit PEs and lateral transfers among the individual PE by selective programming and data transfer via the cross-bar switch, thereby reformatting the incoming data at a significantly increased speed and while having the data instantly available for subsequent data manipulation and processing by the individual PE.

The inventive processor architecture is operable with individual PEs having a limited or reduced instruction set, wherein typically, the PE includes at least two data registers, and the ability to selectively and conditionally transfer data between the associated memory and one or both of the registers upon receipt of corresponding control and address signals, providing at least the capacity to provide the logical data input or logical data functions. Thus, the individual PE is structurally and functionally simplified, thus permitting close association with the corresponding memory elements, preferably on the same integrated circuit substrate.

Data transfer from the inventive SIMD parallel processor is provided directly from the memory elements via the registers of the individual PEs, thus further reducing the hardware requirements, and permitting additional increases in data processing and throughput capacity.

Moreover, according to one embodiment of the present invention, the above described novel processor architecture is implemented with a novel use of a commercially available video DRAMs and an associated separate commercially available N×N cross-bar switch, which may be combined in multiple groups to form a massively parallel SIMD processor (e.g. of 32,768 PEs).

BRIEF DESCRIPTION OF THE DRAWING

These and other features of the present invention will be better understood by reading the following detailed description, taken together with the drawing, wherein.

DETAILED DESCRIPTION OF THE INVENTION

Figure 1:
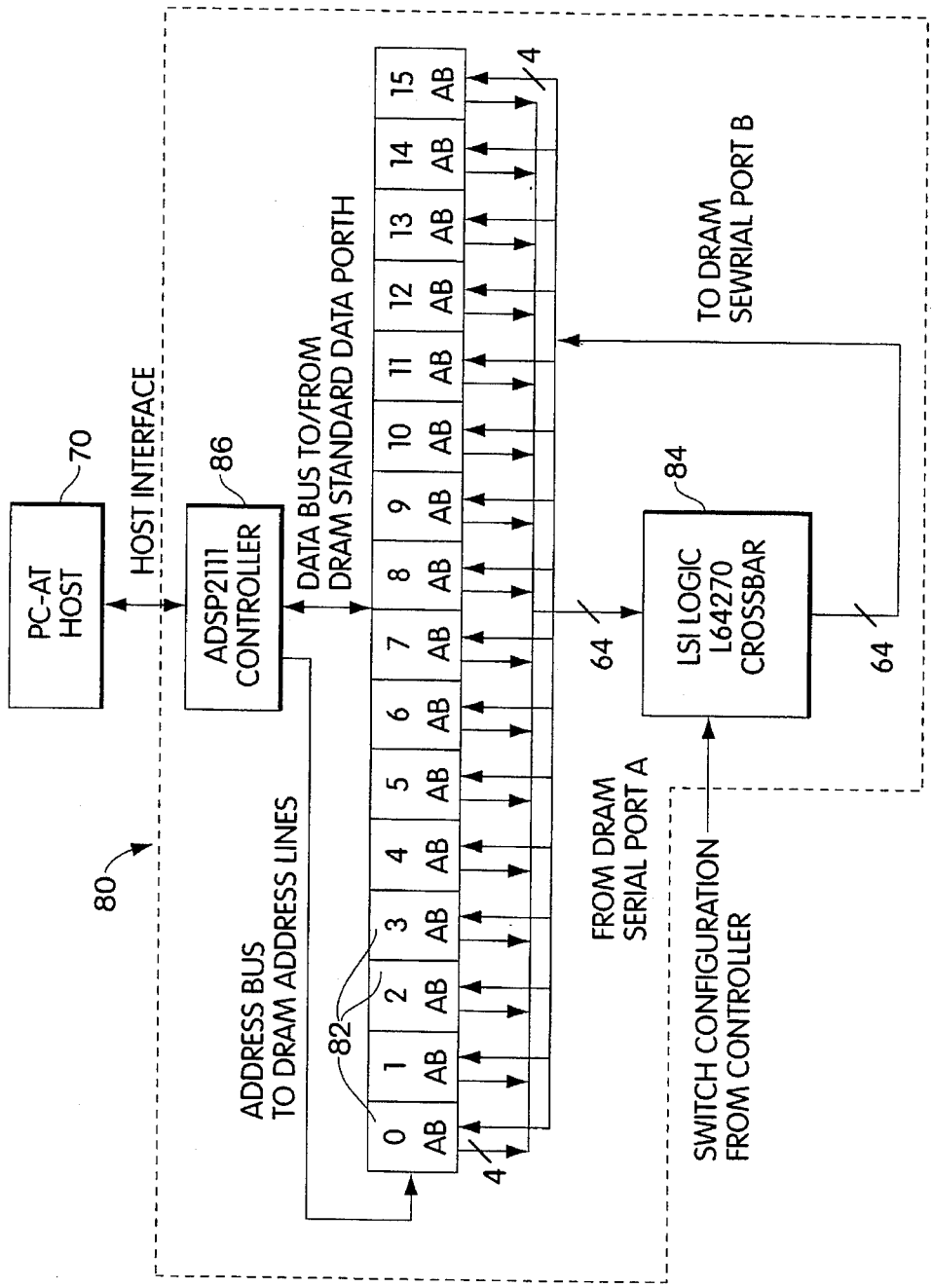
FIG. 1 is a block diagram of one embodiment of the SIMD parallel processor according to the present invention.

The architecture of one embodiment of the parallel SIMD processor 80 according to the present invention is shown in FIG. 1. The processor 80 is connected to a host CPU 70, such as the processor in an IBM® PC AT by available input/output connections on the motherboard of the host computer. The processor 80 includes 32,768 individual 1-bit PEs, each having an associated 512 bits of memory, as implemented with 16 each of a video DRAM 82 (having a general configuration 82 shown in FIG. 2A) part number MT43C4257/8, manufactured by Micron Technology, wherein each of the 16 individual DRAM units provides 2048 (512×4) of the 1-bit processing elements (PEs), and include a 512×512×4 DRAM array, two 2,048-bit data registers, and a 2,048-bit 'mask' register on which the transfer between registers and memory are conditioned, further discussed below with regard to FIGS. 2 and 2A. According to one embodiment of the present invention, the 16 DRAM elements 82 both store the data and perform the logical and arithmetic computation on the stored data. A switch, 84 comprising a part number L64270 manufactured by LSI Logic comprise a 64 to 64 cross-bar switch, used to provide the lateral data transfer (across DRAM columns). Data is transferred between the host CPU 70 and the M/PEs 82 via a controller digital signal processor (DSP) 86 such as part number ADSP2111 manufactured by Analog Devices, Inc., which also receives address and control signals from the host CPU 70, and provides a sequence of control signals to the PEs 82 and to the switch 84, discussed in detail below.

The host computer 70 and the controller DSP 86 are interconnected according to conventional techniques in the art, which are apparent upon reading the corresponding schematic, part description and operation information of each. The controller DSP 86 and the video DRAMs 82 are similarly interconnected according to conventional techniques apparent upon reading the corresponding product data and description information. According to the present invention, the address, data and control signal connection of the host computer 70, the controller DSP 86 and the video DRAMs are connected to permit the host computer 70 to first compile and transfer intermediate level instructions (e.g. macro or vector instructions) to the controller DSP 86, which processes (e.g. interprets) the received instructions, and provides a corresponding sequence of 'instructions' to the DRAMs 82 via the timing and control signals (110). Also according to the present invention, the host computer 70, the controller DSP 86 and the video DRAMs are interconnected to permit data transfer between the host computer 70 and the video DRAMs 82 via the controller DSP 86 and directly between the video DRAMs 82 and the host computer 70.

The instructions issued by the host computer 70 to the controller DSP 86 typically include a 10–20 byte package which forms a vector instruction. The package contains a vector op-code, RAS addresses (explained further, below), length of data operands, and codes indicating the number of repetitions and corresponding RAS addresses. The controller DSP 86 receives these op-codes from the host computer 70 and issues a corresponding sequence of address and control signals to the video DRAMs 82, as illustrated by the relatively simple examples of Tables 2–8, below. However, more complex functions may result in a sequence of perhaps thousands of video DRAM 'instructions' in response to a single vector op-code.

Figure 2:
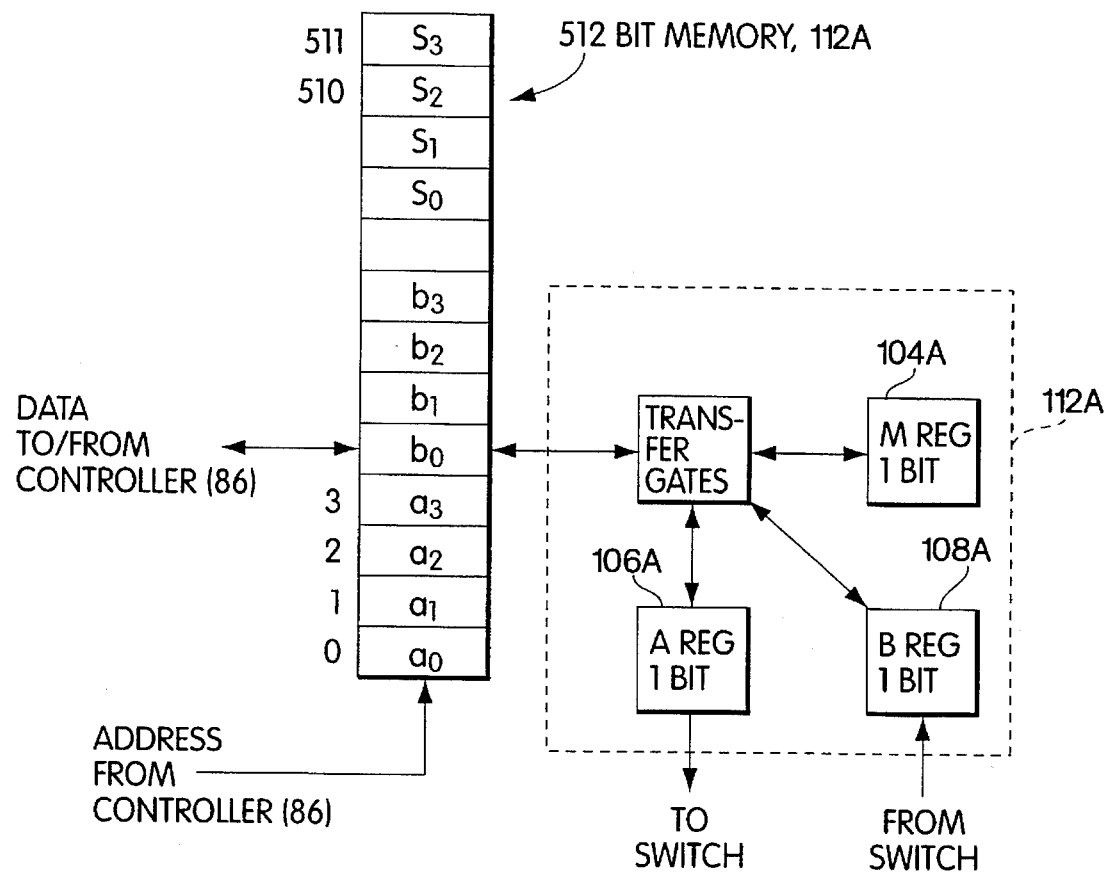
FIG. 2 is a simplified block diagram of the unitary PE memory and processor implementation according to one embodiment of the present invention.

A simplified block diagram of the PE 82 is shown in FIG. 2. Selected transfer between the A register 106A and/or the B register 108A and the memory array 102A (1-dimension shown) is provided by timing and logic control of the ALU 112A (according to timing and logic signals 110 of FIG. 2A) and data stored in the mask (M) register 104A upon which the memory to register and register to memory transfer may be conditioned.

According to one embodiment of the present invention, the controller 86 provides row address strobe (RAS) and column address strobe (CAS) signals to the video DRAMs 82 to provide read and write data transfers within the memory contained therein, and provides special RAS cycles providing selective access and conditional data transfer between the memory portions and the registers therein as illustrated by Table 1, below. According to the massively parallel structure of the present embodiment, the cycles described and controlled by the controller 86 are executed simultaneously by all video DRAMs 82. The controller 86 further configures the cross-bar switch elements 84 to cause the data stored in the PE 82A to be transferred via a serial output port A, through the cross-bar switch 84, and into a selected PE serial input port B, discussed in more detail below.

Figure 2A:
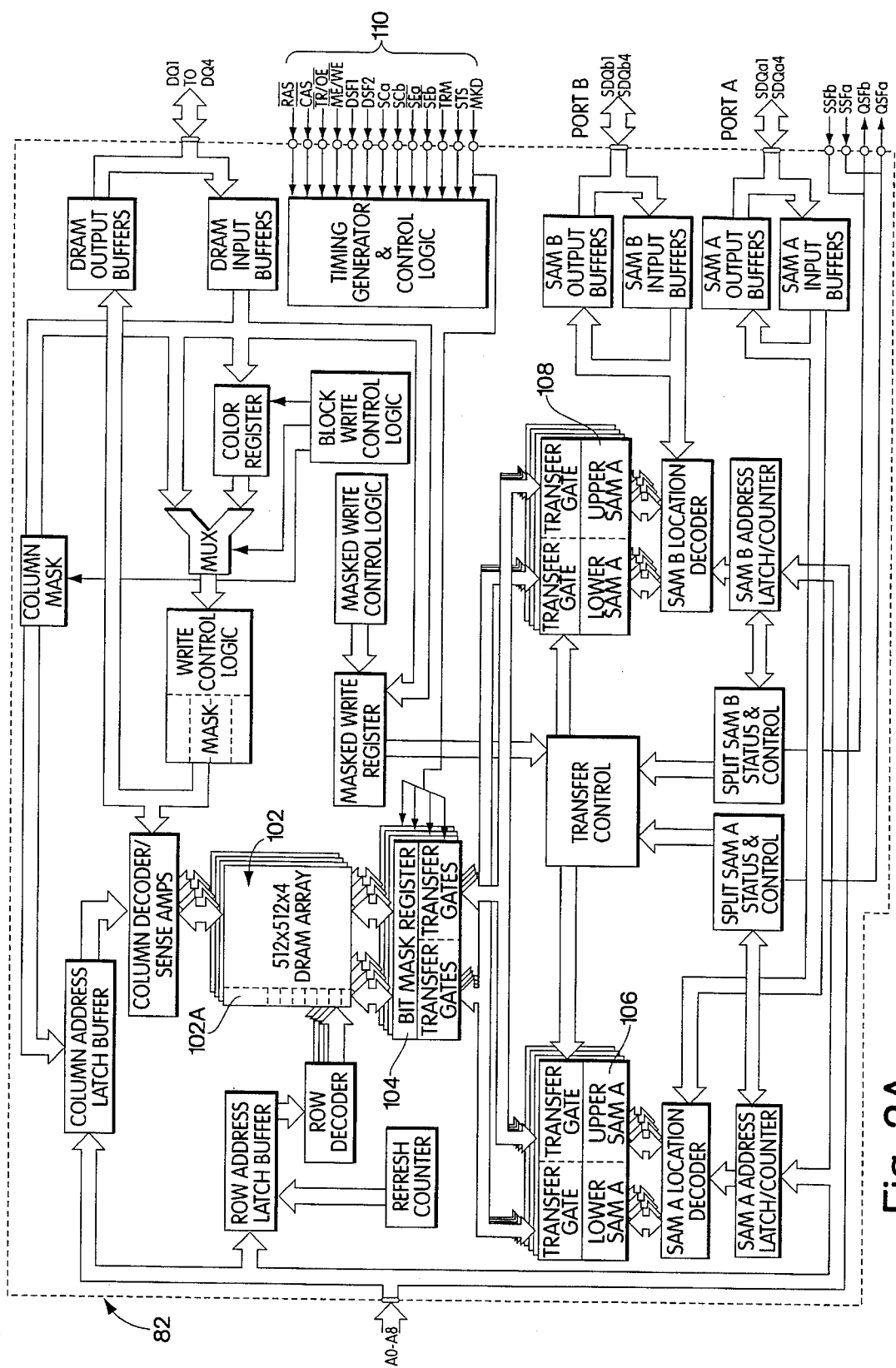
FIG. 2A is a more detailed block diagram of the memory and PE of FIG. 2 according to one embodiment of the present invention.

A more detailed internal block diagram of an individual (one of 16) video DRAMs 82 is shown in FIG. 2A, wherein 2,048 (512×4) parallel rows of memory elements, each comprising 512 column disposed locations of dynamic memory is provided in the array 102. Thus, according to one embodiment of the present invention, a single PE can perform the selective and conditional transfer of data from each (512 bit) column of the DRAM array 102 to each one of the 512 bit locations in the registers 106 and 108, and each data bit selected transfer via port A or port B under control of timing and logic signals 110, so that a single part MT43C4257/8 provides a 2,048 m/PEs. Further detail of the MT43C4257/8 video DRAM 82A is provided in the preliminary data specification published by Micron Technology, Inc. of Boise, Id., and other related publications, hereby incorporated by reference.

Each PE 82A has 512 bits of memory which lie on a single column address, as provided by controller 86. Therefore, the column addresses correspond to the PEs (e.g. numbered 0 to 32,767) and corresponds to memory locations in each particular PE 82A, and are numbered consecutively from 0 to 511. In operation, all PEs read or write to the same memory row address in their respective memories simultaneously, corresponding to the DRAM RAS cycles. Thus according to the present embodiment, the total system memory is 16 megabits or 2 megabytes. Each PE has 3 1-bit registers, the A, B and M registers which are used to move data, perform logic and arithmetic, and correspond to the DRAM A, B, and M register arrays, discussed above.

Figure 3A:
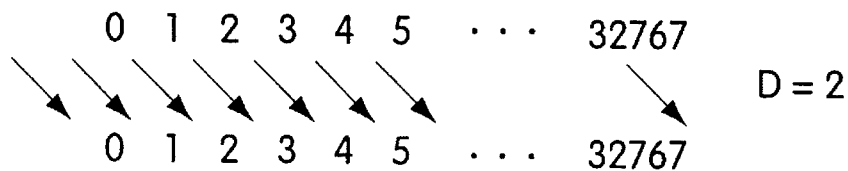
FIG. 3A and FIG. 3B are graphical representations of data transfer provided by the cross-bar element of one embodiment of the present invention.
Figure 3B:
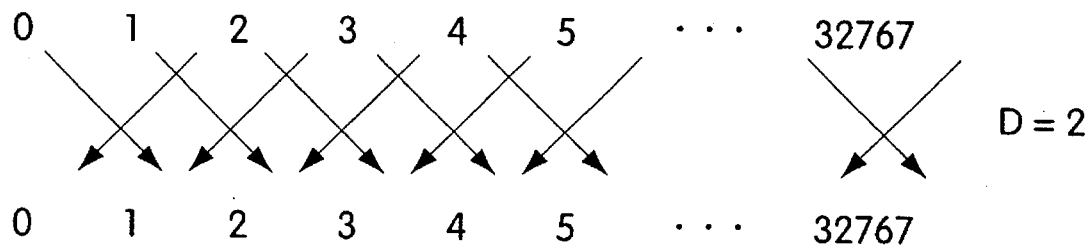

The switch 84 used during a communication cycle provides each PE to transfer 1 bit of data to another PE. Therefore, during a single communication cycle, 32,768 bits of data are transferred. Processor to processor transfer of data primarily comprises 'barrel shift' and 'exchange' mechanisms using the switch 84 illustrated in FIG. 3A and FIG. 3B, respectively. The shift mechanisms corresponding to a 'barrel' shifter, allowing data to be sent from a selected PE (i) to another PE (i+D) modulo Max, where i denotes a particular PE and D is the shift distance, and Max is the maximum number of PE, in this embodiment, 32,767. Implementing the shift mechanism in this embodiment is done in the following steps, where D is the shift distance, and % denotes 'modulo' arithmetic.

First, move data from source memory location to register A. Next, select tap address of register A to be 0, and select tap address of register B to be D%512. Fourth, select cross-bar rotation distance of (integer)D/512, and clock the cross-bar (512-D) cycles. Sixth, move data from register B to destination memory location. Seventh, select tap address of register A to 512-D%512, then select tap address of register B to 0. Ninth, select cross-bar rotation distance of ((integer)D/512)+1). Tenth, clock the Cross-bar D cycles, then set the mask register M to select the first D%512 bits. Twelfth, merge remaining D bits to destination memory location using the ?= operator.

Figure 4A:
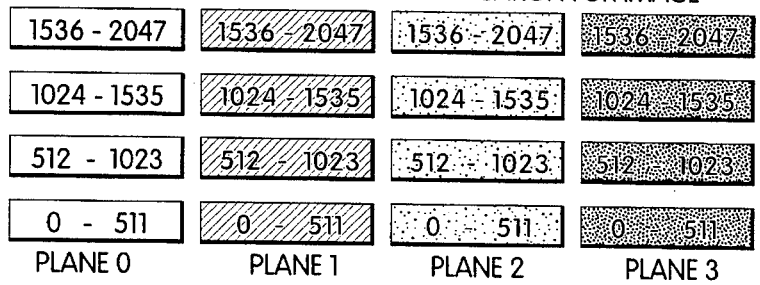
FIG. 4A, 4B, 4C, 4D, 4E are examples of steps of data format translation according to one method of the present invention.
Figure 4B:
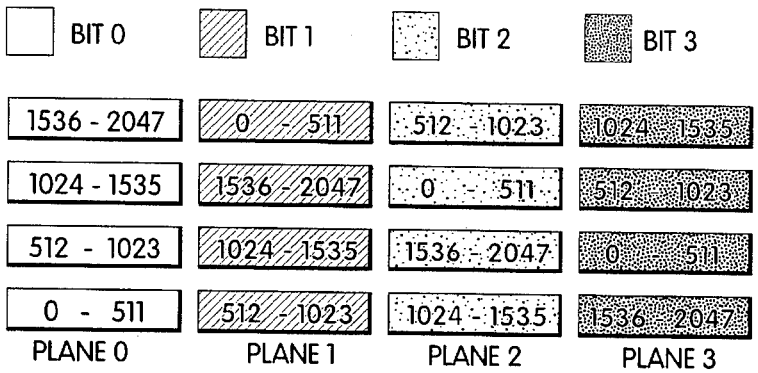
Figure 4C:
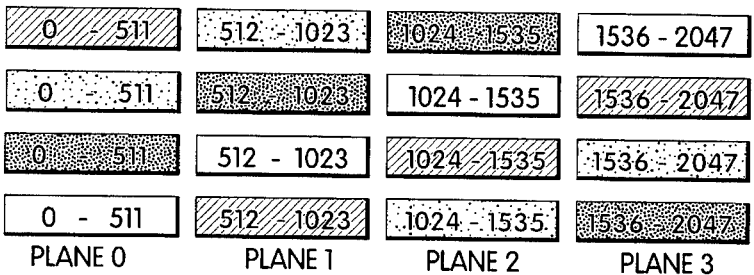
Figure 4D:
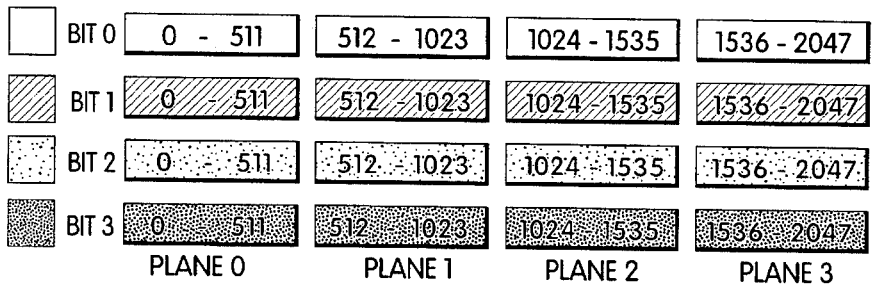
Figure 4E:
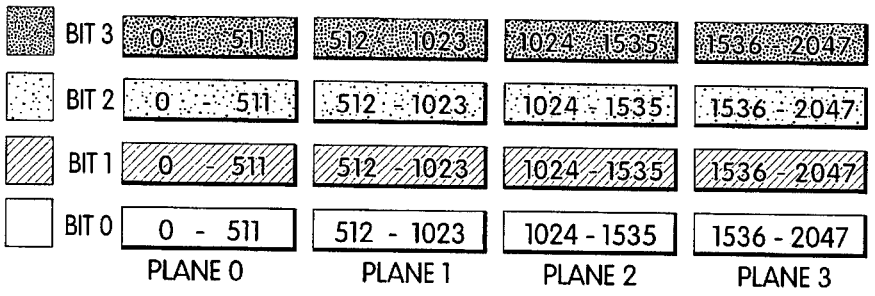

As described above, each individual PE relates to a single 512 bit column in the DRAM array 102. A further novel feature of the present invention relates to the transformation of the incoming data format into a column aligned data format to be processed in the PEs, known as "corner turning". According to the one embodiment of the invention, data is received via the ports (A or B) across the columns along each row in a format orthogonal to a format in which the individual memory and processor elements can process the data in a parallel fashion. An example of data format transformation according to one method of the present invention is illustrated in FIGS. 4A–4E, wherein an image comprising 2,048 4-bit pixels are sequentially received and stored in the DRAM array 102, FIG. 4A in accordance with normal memory allocation techniques for an image. Next, the stored data is rotated within columns so that the shift distance required for all elements within a row is the same, resulting in the data structure illustrated by FIG. 4B. This manipulation is provided at high speed by parallel operation for PEs implemented by using the corresponding registers 104, 106 and 108. Next the image data is laterally (across columns) shifted along the rows by operation of the switch 84 wherein the data is transferred from the appropriate row to register A, transferred out of register port A through the switch (84) back into register port B after shifting the appropriate distance and then back to the same row. The resulting data structure is shown in FIG. 4C. The image data is then rotated along DRAM array 102 columns at internal memory data transfer speeds using the corresponding registers 104, 106 and 108 to provide the data structure illustrated by FIG. 4D. Finally, the sequence of the column is reversed, again using the high speed internal data transfer rate of the internal register operations of registers 104, 106 and 108 to provide the final desired structure of FIG. 4E where the bits of each pixel are aligned vertically in the column of each PE. Thus it can be seen that the data received (along rows) is realigned (or corner turned) along columns, in a format compatible with the parallel structure of the embodiment of the present invention discussed. Thus, the normal format of the data, such as image pixels, is not required to correspond to the SIMD memory allocation scheme, but can be transferred or translated efficiently using the processor and memory element software in combination with the switch 84.

Data arrays composed of elements such as integers, characters and structures are allocated one array element per PE. The bits of an element are not allocated across multiple PEs, although other elements of the array and their constituent bits reside in adjacent PEs. Typically, as indicated on DRAM array 102 in FIG. 2, three exemplary integers, called a, b, and s, each 4 bits long are allocated in the memory of a single PE, 102A (see also FIG. 6). According to one embodiment of the present invention, the 17 basic operations listed below in Table 1 (from among a larger set of memory and register operations available for the below-listed part number, or equivalent device) are performed between the column memories and the associated 1 bit A, B, and M registers forming the 1 bit PEs and includes bit transfer, bit inversion, and bit masking, and are provided by manipulation of the timing and control signals 110 for the memory and PE 82 illustrated in FIG. 2, comprising part number MT43C4257/8.

TABLE 1

| | |
|---|---|
| A = mem (addr) | load A reg with memory |
| B = mem (addr) | load B reg with memory |
| M = mem (addr) | load M reg with memory |
| M~ = mem (addr) | load M reg with complement of memory |
| M = O | load M reg with O |
| A = M | load A reg with M reg value |
| B = M | load B reg with M reg value |
| M = A | load M reg with A reg value |
| M = B | load M reg with B reg value |
| mem (addr) = A | load memory with A reg |
| mem (addr) = B | load memory with B reg |
| mem (addr) = M | load memory with M reg |
| mem (addr) ~=M | load memory with complement of M reg |
| mem (addr) ? = A | load memory with A reg if M reg set |
| mem (addr) ? = B | load memory with B reg if M reg set |
| A ? = mem (addr) | load A reg with memory if M reg set |
| B ? = mem (addr) | load B reg with memory if M reg set |

The operations of Table 1, above, are provided by one of ordinary skill in accordance with published video DRAM specification and application information incorporated by reference. The connection of the timing and control leads (110) to the controller 86 and the programming thereof to achieve the operations of Table 1 via the host 70 is provided by one of ordinary skill in the art. Such 1-bit operations of Table 1 can be sequentially executed to perform useful higher order operations, including copy, conditional copy, and, or, invert, add, subtract, multiply, divide, square root, and other data manipulations or functions. The sequential execution to provide these functions are provided by the controller 86.

An exemplary program illustrating a copy of one bit at address 'a' to address 'b' is shown below in Table 2. Each operation is a separate controller (86) instruction to the PE.

TABLE 2

A=mem(a)
mem(b)=A

Table 3 demonstrates a program which performs the OR operation on bits at address 'a' and address 'b' and places the result in address 'result'; address 'one' contains a 1.

TABLE 3

| data cases | a=0,b=0 | a=0,b=1 | a=1,b=0 | a=1,b=1 |
|---|---|---|---|---|
| A=mem(one) | A=1 | A=1 | A=1 | A=1 |
| M~=mem(a) | M=1 | M=1 | M=0 | M=0 |

TABLE 3-continued

| | | | | |
|---|---|---|---|---|
| A?=mem(b) | A=0 | A=1 | A=1 | A=1 |
| mem(result)=A | result=0 | result=1 | result=1 | result=1 |

Table 4 demonstrates a program which performs the AND operation on bits at address 'a' and address 'b' and places the result in address 'result'; address 'zero' contains a 0.

TABLE 4

| data cases | a=0,b=0 | a=0,b=1 | a=1,b=0 | a=1,a=1 |
|---|---|---|---|---|
| A=mem(zero) | A=0 | A=0 | A=0 | A=0 |
| M=mem(a) | M=0 | M=0 | M=1 | M=1 |
| A?=mem(b) | A=0 | A=0 | A=0 | A=1 |
| mem(result)=A | result=0 | result=0 | result=0 | result=1 |

Table 5 demonstrates a program which implements a software multiplexer. It copies either bit 'a' or 'b' to bit 'result' depending upon whether bit 'p' is set; set yields a, unset yields b.

TABLE 5

| data cases | a=0,b=1,p=0 | a=0,b=1,p=1 |
|---|---|---|
| A=mem(b) | A=1 | A=1 |
| M=mem(p) | M=0 | M=1 |
| A?=mem(a) | | |
| mem(result)=A | result=1 | result=0 |

Table 6 demonstrates a program which inverts a bit 'a' and places it in 'result'.

TABLE 6

M~=mem (a)
mem(result)=M

Table 7 is a program which implements a full adder which can add two bits, 'a' and 'b' with a carry bit 'c', and produce a sum bit 's' and place the carry bit in 'c'.

TABLE 7

| data cases | a=0 | a=0 | a=1 | a=1 | a=0 | a=0 | a=1 | a=1 |
|---|---|---|---|---|---|---|---|---|
| | b=0 | b=1 | b=0 | b=1 | b=0 | b=1 | b=0 | b=1 |
| | c=0 | c=0 | c=0 | c=0 | c=1 | c=1 | c=1 | c=1 |
| M~=mem(b) | M=1 | M=0 | M=1 | M=0 | M=1 | M=0 | M=1 | M=0 |
| B=M | B=1 | B=0 | B=1 | B=0 | B=1 | B=0 | B=1 | B=0 |
| M~=mem(c) | M=1 | M=1 | M=1 | M=1 | M=0 | M=0 | M=0 | M=0 |
| B?=mem(b) | B=0 | B=1 | B=0 | B=1 | B=1 | B=0 | B=1 | B=0 |
| M=B | M=0 | M=1 | M=0 | M=1 | M=1 | M=0 | M=1 | M=0 |
| A=mem(a) | A=0 | A=0 | A=1 | A=1 | A=0 | A=0 | A=1 | A=1 |
| mem(c)?=A | c=0 | c=0 | c=0 | c=1 | c=0 | c=1 | c=1 | c=1 |
| mem(s)~=M | s=1 | s=0 | s=1 | s=0 | s=0 | s=1 | s=0 | s=1 |
| M~=mem(a) | M=1 | M=1 | M=0 | M=0 | M=1 | M=1 | M=0 | M=0 |
| mem(s)?=B | s=0 | s=1 | s=1 | s=0 | s=1 | s=0 | s=0 | s=1 |
| result (a+b+c) | s=0 | s=1 | s=1 | s=0 | s=1 | s=0 | s=0 | s=1 |
| | c=0 | c=0 | c=0 | c=1 | c=0 | c=1 | c=1 | c=1 |

Figure 5:
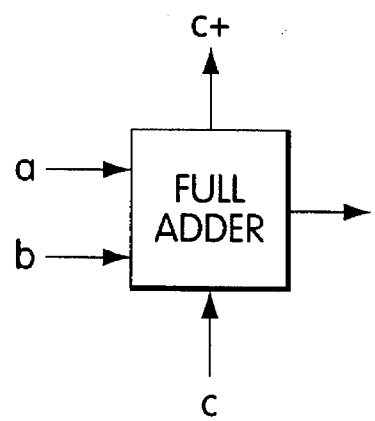
FIG. 5 is a graphic symbol illustration of a full adder operable according to the present invention.
Figure 6:
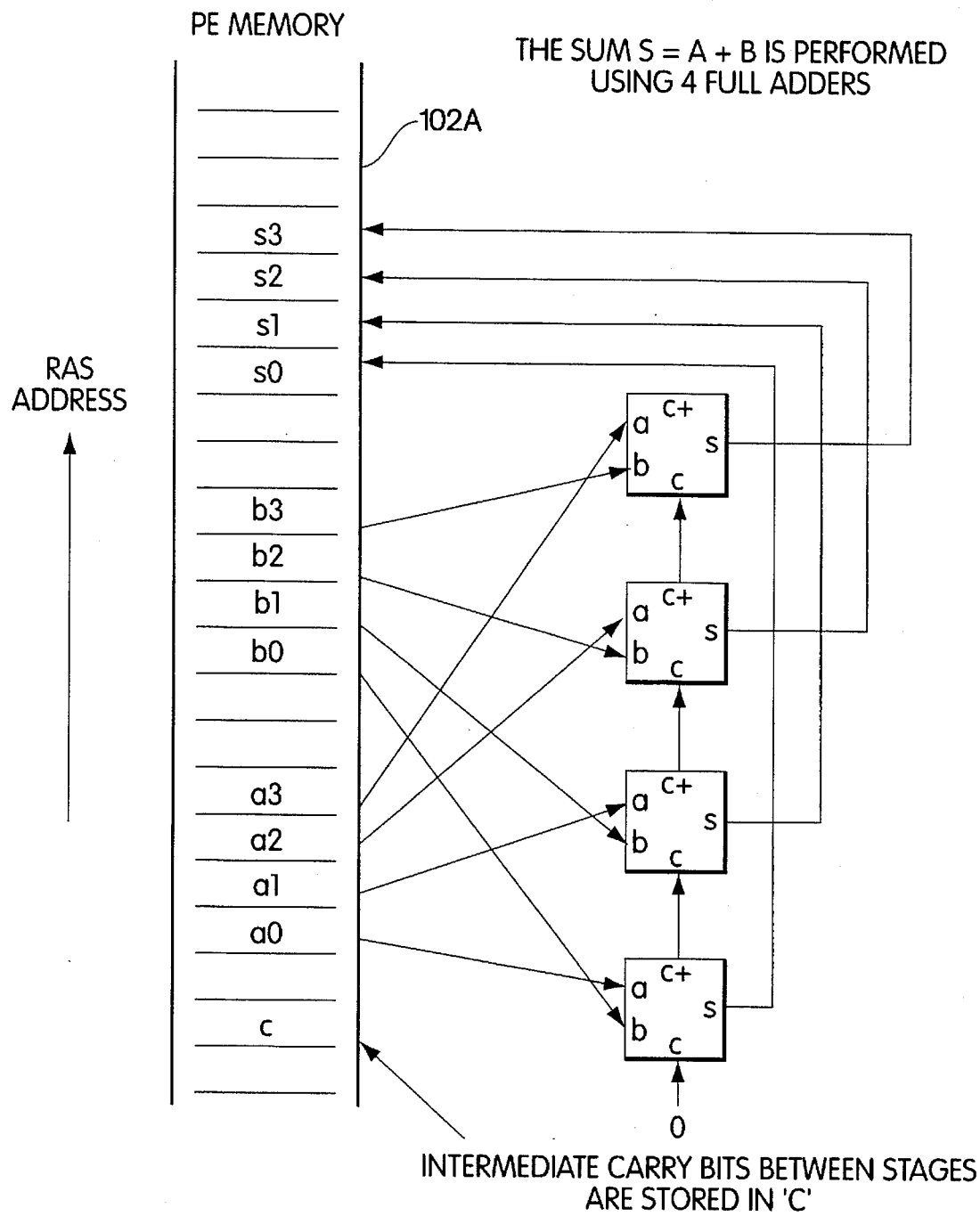
FIG. 6 is a block diagram illustration of the use of a full adder of FIG. 5 to perform a multiple bit add according to one embodiment of the present invention.

This process takes 10 RAS cycles and is represented by a full adder circuit block 150 as shown in FIG. 5. The sum s=a+b where a and b are 4-bit numbers is performed using 4 full adders in 4 times 10 or 40 RAS cycles. This is shown in FIG. 6.

Table 8 demonstrates a program which multiplies two 8-bit numbers located at addresses 'a' and 'b' and puts the 16 bit product at address 'p'. The addresses are RAS addresses.

TABLE 8

```
int i,j;    /*these are working index variables used by
            controller*/
int a;      /*address of an 8-bit number to be multiplied*/
int b;      /*address of an 8-bit number to be multiplied*/
int p;      /*address of a 16-bit array for the product*/
int psum;   /*address of an 8-bit scratch area for the partial sum*/
/*zero the product*/
M=0
for (i=0; i<16;i++){
    mem(p+i)=M
}
/*loop over bits in b*/
for (i=0;i<8;i++){
    /*multiply bit b[i] by a*/
    M=0
    for (j=0;j<8;j++){
        mem(psum+j)=M
    }
    M=mem(b+i)
    for (j=0;j<8;j++){
        A=mem(a+j)
        mem(psum+j)?=A
    }
    /*add partial sum to product*/
    M=0
    mem(carry)=M
    for (j=0;j<8,j++){
        M~=mem(psum=j);
        B=M;
        M~=mem(carry);
        B?=mem(psum=j);
        M=B;
        A=mem(p+i+j);
        mem(carry)?=A;
        mem(p+i+j)~=M;
        M~=mem(a);
        mem(p+i+j)?=B
    }
}
```

A further novel feature of the present invention provides for the programming of the parallel SIMD processor in the C language with an extension, comprising two key words "parallel" and "pfor". Accordingly, the pre-processor (in the host CPU 70) will read the extended C program, parse out the above referenced key words, insert calls to the controller 86, and generates ordinary C code which is then compiled (by the host computer 70) using the host computer's compiler.

The "parallel" key word is used to declare data arrays which are allocated on the machine. The "pfor " key word is used to perform a parallel loop on the parallel SIMD processor. For example, a program fragment which declares an array to contain an image, declares an array to contain a filtered version of that image, and "pfor" loops to perform the computation as given below in Table 9.

TABLE 9

```
parallel unsigned char image [262,144];
parallel int filter [262,144];
pfor (i=0;i<262,144;i++) {
    filter [i] = image [i] +
        image [i−1] + image [i+1] +
        image [i−512] + image [i + 512];
}
```

The "parallel" key word allocates storage for the array "image" in the processor element (PE) memory. All 8 bits of "image [0]" are allocated in PE [0], all 8 bits of "image [1]" are allocated to PE [1], and so on for elements 2 through 32,767. Elements 32,768 through 65,535 are allocated in PE[0] through PE [32,767] at the next higher bit address in each PE this process continues until all elements of both arrays are allocated.

The "pfor" key work operates on all elements of "image" and "filter" in parallel. The elements of "image [0]" and "filter [0]" are in the same PE. The same is true for elements "image [i]" and "filter [i]" for "i" from 0 to 262,143. It is therefore trivial to sign extend "image[i]" and assign it to "filter [i]" from 0 to 262,143. However "filter [i]" is not the same as PE "image [i+1]", so "image [i+1]" must be shifted from "PE [i+1]" to "PE [i]" using the switch 84. After it is shifted, it can be sign extended and added to "filter [i]".

The switch 84 performs the shifting necessary when the "pfor" body uses "parallel" array indices which involve "i" and "i+ offset" in the same expression. The symbol "offset" represents an expression which is constant over the loop and corresponds to the switch shift distance D.

The scope of the present invention includes implementation with custom integrated or other commercially available integrated circuits and/or non-video DRAM structures manufactured or used in accordance with the above-described invention. Further modifications and substitutions made by one of ordinary skill in the art are considered to be within the scope of the present invention which is not to be limited except by the claims which follows.

What is claimed is:

1. A SIMD processor comprising:
   a plurality of single-bit memories each having contiguously disposed serial memory elements; and
   a plurality of single-bit non-arithmetic, conditional data transfer processing elements, each connected to receive contiguous serial data elements from a corresponding one of said single-bit memories; and
   a cross-bar switch connected to selectively transfer serial data between said single-bit processing elements.

2. The SIMD processor of claim 1, wherein said processing elements comprise a plurality of data registers including a conditionally storable data register.

3. The SIMD processor of claim 2, wherein said conditionally storable data register is responsive to data register resident mask data.

4. The SIMD processor of claim 3, comprising two data registers and one mask register.

5. The SIMD processor of claim 1, wherein,
   said plurality of single-bit memories and single-bit processing elements are arranged to form a single integrated circuit.

6. The SIMD processor of claim 1, wherein said contiguously disposed serial memory elements are accessible by a common address.

7. A SIMD processor comprising:
   a plurality of addressable 1-bit×N location memory elements;
   a plurality of 1-bit processing elements each connected to receive a selected serial contiguous data elements from a corresponding said 1-bit memory, wherein
   each said 1-bit processing elements includes a mask bit register and a data register conditionally loadable in response to the contents of said mask-bit register, providing the operations comprising copy, or, invert, including selected bits in said 1-bit memory; and
   a processing element controller having a corresponding instruction set and being connected to said plurality of 1-bit processing elements mask and data registers and said plurality of 1-bit×N memory elements for providing a selected sequence of non-arithmetic, conditional processing element data transfers, which plurality conditional processing element data transfers together provides a corresponding one of a plurality of logical and arithmetic operations comprising data copy, conditional data copy, and, or, invert, add, subtract, multiply and divide.

8. The SIMD processor of claim 7, wherein said memory locations and said processing elements operative according to said programmed instruction set provides add, subtract, multiply, divide, square root.

9. The SIMD processor of claim 7, further including a cross-bar switch connected to selectively transfer data between said 1-bit processing elements.

10. The SIMD processor of claim 9, wherein
a first integrated circuit includes said plurality of said 1-bit by N location memory elements and said plurality of 1-bit processing elements, and wherein
a second integrated circuit comprises said cross-bar switch.

11. The SIMD processor of claim 10, comprising 16 integrated circuits having said plurality of 1-bit by N location memory elements and said plurality of 1-bit processing elements.

12. A SIMD data format apparatus, comprising
means for receiving sequential n-bit wide data words into a plurality of rows;
means for rearranging the rows for uniform shift distance for all elements within a row;
means for shifting data along the rows; and
means for rearranging data along a plurality of columns.

13. The SIMD data format apparatus of claim 12, further including a plurality of processing elements for processing data stored in said means for receiving.

14. The SIMD data format apparatus of claim 13, wherein said plurality of processing elements receives said rearranged data.

15. The SIMD data format apparatus of claim 14, further including means for transferring processed data between said SIMD data format apparatus and external equipment.

16. The SIMD data format apparatus of claim 15, wherein said received data comprises image data.

17. A processor comprising:
a memory element including
a plurality of columns of contiguous addressable storage locations according to an address signal,
an 'M' register adapted to store a condition code,
an 'A' register adapted to conditionally receive data from one of said plurality of storage locations according to the contents of said 'M' register, wherein
said memory element includes means for logically inverting said data and performing at least one of a logical 'and' and a logical 'or'; and
a control means connected to said memory element for providing arithmetic operations by a sequence of non-arithmetic, conditional logical memory and memory data transfers including a plurality of the operations by said 'A' and 'M' registers,
wherein the arithmetic operations comprises data copy, conditional data copy, and, or, invert, add, subtract, multiply, divide and square root functions.

18. The processor of claim 17, further including
a 'B' register for selectively receiving addressed data according to the contents of said 'M' register.

19. The processor of claim 18, wherein said memory integrated circuit includes a plurality of 'M', 'A' and 'B' registers.

20. The processor of claim 17, wherein said memory element comprises a memory integrated circuit.

21. A processor comprising:
a memory element including
a plurality of columns of contiguous 1-bit storage locations addressable according to an address signal,
a register adapted to conditionally receive data from one of said plurality of storage locations, wherein
said memory element includes means for logically inverting said data and performing at least one of a logical 'and' and a logical 'or'; and
a control means connected to said memory element for providing a selected sequence of non-arithmetic, conditional logical memory and memory data transfers, which together provides a corresponding one of a plurality of logical and arithmetic operations comprising data copy, conditional data copy, and, or, invert, add, subtract, multiply, divide, square root of data arranged along the column of contiguous storage locations.

22. The processor of claim 21, further including a cross-bar switch for selectively transferring data between registers corresponding to different ones of said plurality of columns of 1-bit storage locations.

23. The processor of claim 22, further including program responsive means for reformatting row-contiguous data into column-contiguous data.

24. The processor of claim 22, wherein said register includes A, B and M registers in association with said column of contiguous 1-bit storage locations.

25. A method of data processing, comprising the steps of:
receiving sequential n-bit wide data words into rows and columns;
rearranging the rows for uniform shift distance for all elements within a row;
shifting data along the rows; and
rearranging data along the columns.

26. The method of claim 25, further including the step of arithmetically processing said data along said columns.

27. The method of claim 26, further including the step of logically processing said data along said columns.

* * * * *